United States Patent
Li et al.

(10) Patent No.: US 9,389,690 B2
(45) Date of Patent: Jul. 12, 2016

(54) GESTURE DETECTION BASED ON INFORMATION FROM MULTIPLE TYPES OF SENSORS

(71) Applicant: QUALCOMM INCORPORATED, San Diego, CA (US)

(72) Inventors: Ren Li, San Diego, CA (US); Ian Clarkson, Toronto (CA); Samir K. Gupta, San Diego, CA (US); Darrell L. Krulce, Solana Beach, CA (US)

(73) Assignee: QUALCOMM Incorporated, San Diego, CA (US)

( * ) Notice: Subject to any disclaimer, the term of this patent is extended or adjusted under 35 U.S.C. 154(b) by 634 days.

(21) Appl. No.: 13/767,698

(22) Filed: Feb. 14, 2013

(65) Prior Publication Data
US 2013/0229508 A1    Sep. 5, 2013

Related U.S. Application Data

(60) Provisional application No. 61/605,636, filed on Mar. 1, 2012, provisional application No. 61/691,989, filed on Aug. 22, 2012.

(51) Int. Cl.
*G06F 3/01* (2006.01)
*G06F 1/32* (2006.01)
*G06F 3/03* (2006.01)

(52) U.S. Cl.
CPC .............. *G06F 3/017* (2013.01); *G06F 1/3287* (2013.01); *G06F 3/011* (2013.01); *G06F 3/0304* (2013.01); *Y02B 60/1282* (2013.01); *Y02B 60/32* (2013.01)

(58) Field of Classification Search
CPC .... Y02B 60/1282; Y02B 60/32; G06F 3/017; G06F 3/011; G06F 3/0304; G06F 1/3287; G06F 3/01; G06F 2203/04106; G06F 3/0488; H04N 5/23241

USPC .......... 345/156; 348/77, 164, 207.1, E5.024, 348/E5.09
See application file for complete search history.

(56) References Cited

U.S. PATENT DOCUMENTS

| 6,583,723 B2 | 6/2003 | Watanabe et al. |
| 7,918,733 B2 | 4/2011 | Zalewski et al. |
| 8,810,719 B2 * | 8/2014 | Hsu et al. ...................... 348/372 |

(Continued)

FOREIGN PATENT DOCUMENTS

| EP | 1550940 A2 | 7/2005 |
| EP | 2284655 A2 | 2/2011 |
| WO | 2004042544 A1 | 5/2004 |

OTHER PUBLICATIONS

International Search Report and Written Opinion for International Application No. PCT/US2013/026307 mailed Jan. 22, 2014, 20 pages.

(Continued)

*Primary Examiner* — Alexander Eisen
*Assistant Examiner* — Abhishek Sarma
(74) *Attorney, Agent, or Firm* — Toler Law Group, PC

(57) ABSTRACT

A method includes receiving a first output from a first sensor of an electronic device and receiving a second output from a second sensor of the electronic device. The first sensor has a first sensor type and the second sensor has a second sensor type that is different from the first sensor type. The method also includes detecting a gesture based on the first output and the second output according to a complementary voting scheme that is at least partially based on gesture complexity.

30 Claims, 12 Drawing Sheets

(56) References Cited

U.S. PATENT DOCUMENTS

| | | | |
|---|---|---|---|
| 2008/0102882 A1* | 5/2008 | Sutardja | 455/550.1 |
| 2009/0139778 A1* | 6/2009 | Butler et al. | 178/18.03 |
| 2009/0296991 A1 | 12/2009 | Anzola | |
| 2010/0031202 A1 | 2/2010 | Morris et al. | |
| 2010/0104134 A1 | 4/2010 | Wang et al. | |
| 2010/0188328 A1 | 7/2010 | Dodge et al. | |
| 2011/0018795 A1* | 1/2011 | Jang | 345/156 |
| 2011/0019056 A1 | 1/2011 | Hirsch et al. | |
| 2011/0107216 A1 | 5/2011 | Bi | |
| 2011/0134251 A1* | 6/2011 | Kim et al. | 348/164 |
| 2011/0141063 A1 | 6/2011 | Grundmann et al. | |
| 2011/0209098 A1 | 8/2011 | Hinckley et al. | |
| 2011/0234543 A1 | 9/2011 | Gardenfors et al. | |
| 2011/0260965 A1* | 10/2011 | Kim et al. | 345/156 |
| 2011/0316767 A1 | 12/2011 | Avrahami | |
| 2012/0084674 A1 | 4/2012 | Visosky | |
| 2012/0280900 A1* | 11/2012 | Wang et al. | 345/156 |
| 2012/0280905 A1* | 11/2012 | Vonog et al. | 345/156 |
| 2012/0287031 A1* | 11/2012 | Valko et al. | 345/156 |
| 2013/0328763 A1* | 12/2013 | Latta et al. | 345/156 |
| 2014/0267142 A1 | 9/2014 | MacDougall et al. | |

OTHER PUBLICATIONS

Partial International Search Report, PCT/US2013/026307, ISA/EPO, Oct. 18, 2013, 7 pages.

Butler, et al., "SideSight: Multi-"touch" Interaction Around Small Devices," UIST'08, Oct. 2008, Monterey, California, USA, pp. 201-204.

* cited by examiner

GESTURE DETECTION BASED ON INFORMATION FROM MULTIPLE TYPES OF SENSORS

I. CROSS-REFERENCE TO RELATED APPLICATIONS

The present application claims priority from commonly owned U.S. Provisional Patent Applications No. 61/605,636 filed on Mar. 1, 2012 and No. 61/691,989 filed on Aug. 22, 2012, the contents of which are expressly incorporated herein by reference in their entirety.

II. FIELD

The present disclosure is generally related to gesture detection.

III. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet Protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player.

Hands-free operation of portable devices such as wireless telephones is becoming desirable in various use cases. For example, in-car hands-free operation of a mobile phone may be desirable for safety reasons. Some electronic systems, such as game consoles, have gesture recognition capabilities. Gesture recognition is often performed using a single sensor (e.g., either a camera or an infrared sensor).

IV. SUMMARY

Gesture recognition systems and methods suitable for use in mobile device applications are disclosed. Notably, the disclosed techniques include leveraging multiple types of sensors to provide more robust gesture recognition. Exemplary applications of the disclosed systems and methods include, but are not limited to, in-car gesture control for in-car entertainment/telephony/navigation, living room media control, gaming, in-kitchen appliance control, multimedia presentation control, gym/exercise equipment control, etc. Moreover, the disclosed systems and methods may be run on various platforms, including mobile phones, embedded devices, netbook computers, tablet computers, laptop computers, media centers, set-top boxes, "smart" appliances, game consoles, etc.

By leveraging multiple sensor types, the disclosed systems and methods may overcome disadvantages associated with single-sensor type gesture recognition systems. For example, consider an embodiment of the disclosed system that leverages both a camera and an ultrasound sensor for gesture recognition. Ultrasound may be used as a low-power front end that "wakes" up the rest of the system when an object is detected proximate to the mobile device. The system may dynamically switch sensors on and off depending on lighting/proximity conditions. When lighting conditions are poor and the camera is unreliable, only ultrasound may be used. Conversely, when a target gesture is far away from the mobile device or the gesture is a steady-state or complex gesture, ultrasound may be unreliable, and therefore only the camera may be used. Various sensors, or portions thereof, may be selectively activated and deactivated based on lighting/proximity conditions (e.g., to conserve power).

When lighting/proximity conditions enable the use of multiple types of sensors, a complementary voting scheme may be applied to the sensor outputs to determine what gesture is detected. For example, each sensor may output a detected gesture (e.g., left, right, up, down, select, etc.) and a confidence level. When both types of sensors detect the same gesture, the gesture may be output. When the sensors detect different gestures, the gesture with the higher confidence may be output. When ultrasound picks up a simple gesture but the camera picks up a complex gesture, the complex gesture may be output.

Each sensor may use information from other sensors to trigger self-adjustment in an attempt to improve its own performance. In one implementation, data may be exchanged via a common data model and/or an application programming interface (API).

In a particular embodiment, an apparatus includes a first sensor configured to generate a first output and a camera configured to generate a second output. The apparatus also includes a processor and a gesture detection module executable by the processor to detect a gesture based on at least one of the first output and the second output. At least a portion of the camera is selectively deactivated based on a lighting level and a gesture range.

In another particular embodiment, a method includes receiving a first output from a first sensor of an electronic device and receiving a second output from a second sensor of the electronic device. The first sensor has a first sensor type and the second sensor has a second sensor type that is different from the first sensor type. The method also includes detecting a gesture based on the first output and the second output according to a complementary voting scheme that is at least partially based on gesture complexity.

In another particular embodiment, an apparatus includes an ultrasound sensor configured to generate a first output in accordance with a common data model and to provide the first output to an ultrasound processing path. The apparatus also includes a camera configured to generate a second output in accordance with the common data model and to provide the second output to an image processing path. The apparatus further includes a processor and a gesture detection module executable by the processor to detect a gesture based on at least one of the first output and the second output. The ultrasound processing path and the image processing path are configured to exchange data in accordance with the common data model.

In another particular embodiment, an apparatus includes an ultrasound sensor configured to provide a first output to an ultrasound processing path and a camera configured to provide a second output to an image processing path. The apparatus also includes a processor and a gesture detection module executable by the processor to detect a gesture based on at least one of the first output and the second output. The ultrasound sensor and the camera are each configured to self-adjust, independent of the processor, based on data exchanged between the ultrasound processing path and the image processing path.

Particular advantages provided by at least one of the disclosed embodiments include an ability to detect gestures based on applying a complementary voting scheme to the outputs of multiple types of sensors, which may provide increased gesture recognition accuracy when compared to single-sensor type systems. In addition, sensors (or portions thereof) may be selectively activated and deactivated based on lighting/proximity conditions (e.g., to conserve power). Further, sensors may self-adjust based on output from other sensors to improve performance.

Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

VI. DETAILED DESCRIPTION

Figure 1:
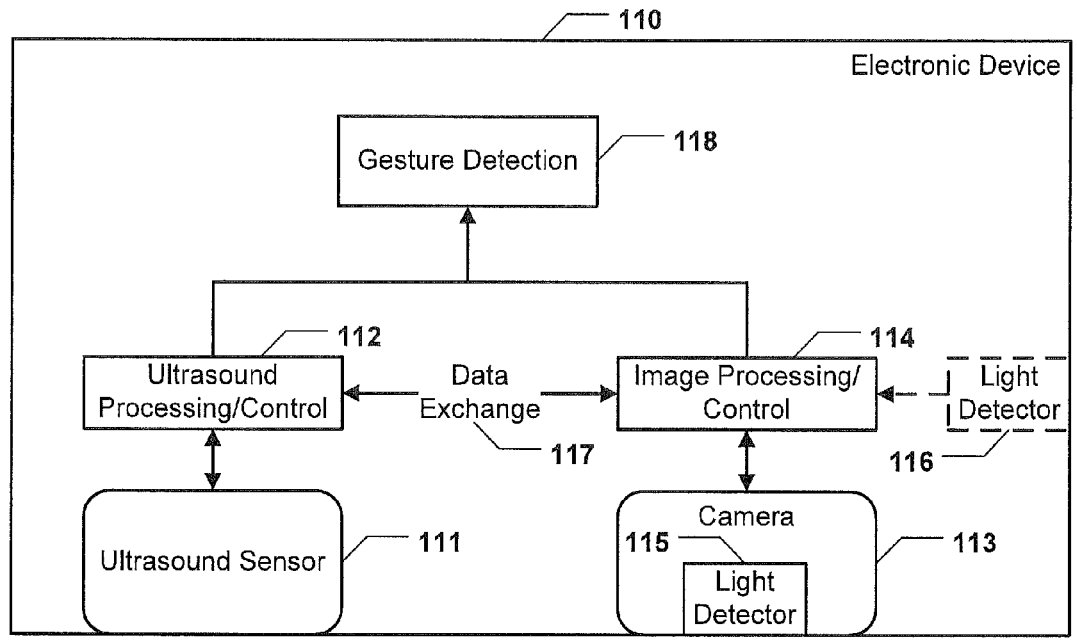
FIG. 1 is a diagram of a particular embodiment of a system operable to perform gesture detection based on information from multiple types of sensors.
Figure 1:
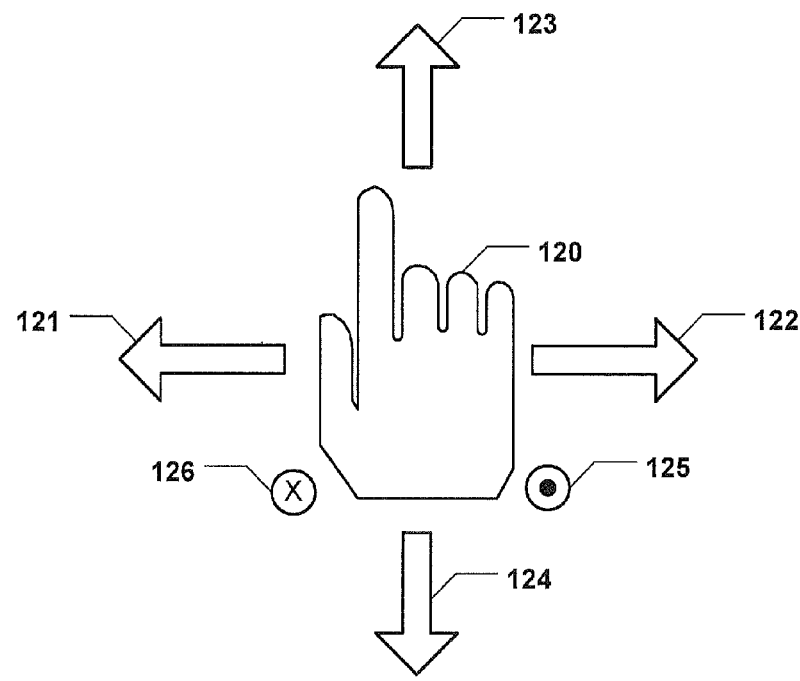

FIG. 1 illustrates a particular embodiment of a system 100 that is operable to perform gesture recognition based on information from multiple types of sensors. For example, as illustrated in FIG. 1, an electronic device 110 may include an ultrasound sensor 111 and a camera 113, and may detect gestures (e.g., made by a hand 120) based on output from the ultrasound sensor 111 and/or the camera 113. It should be noted that the specific types of sensors in FIG. 1 are for example only. Other types of sensors, such as infrared and magnetic, may be included instead of, or in addition to, the ultrasound sensor 111 and the camera 113. The electronic device 110 may be a wireless device (e.g., a mobile phone or a smartphone), a computing device (e.g., a laptop computer, a tablet computer, a portable media player, a personal digital assistant (PDA), etc.), an accessory associated therewith, or any combination thereof.

It should be noted that as used herein, the term "ultrasound sensor" may identify a sensor that is capable of sensing only ultrasound signals (i.e., a dedicated ultrasound sensor) and may also identify a sensor that is capable of sensing other signals in addition to ultrasound signals (i.e., a multi-purpose sensor). For example, the multi-purpose sensor may also be operable to sense audio signals that are within the human range of hearing (e.g., 20 Hz to 20 kHz) and/or other types of signals (e.g., electromagnetic signals, radio frequency (RF) signals, etc.).

Each sensor 111, 113 of the electronic device 110 may be coupled to a signal processing path, illustrated in FIG. 1 by an ultrasound processing/control module 112 and an image processing/control module 114. Each of the processing/control modules 112 and 114 may be configured to control the operation of and process the output generated by the corresponding respective sensors 111 and 113. For example, the ultrasound processing/control module 112 may process first output generated by the ultrasound sensor 111 and the image processing/control module 114 may process second output generated by the camera 113.

The processing/control modules 112 and 114 may be coupled to a gesture detection module 118. The gesture detection module 118 may detect a gesture (e.g., made by the hand 120) based on the first output from the ultrasound sensor 111 and/or the second output from the camera 113. Each of the first output from the ultrasound sensor 111 and the second output from the camera 113 may include an identified gesture and a confidence score. To illustrate, the identified gesture with respect to the hand 120 may be left 121, right 122, up 123, down 124, away 125 (i.e., in a direction out of the plane of FIG. 1) or towards 126 (i.e., in a direction into the plane of FIG. 1). In a particular embodiment, the towards 126 and/or the away 125 gestures may represent a "select" gesture (e.g., during navigation of a menu or list). It should be noted that the gestures 121-126 are for illustration only. Other types of gestures, including complex and steady state gestures, may also be detected. For example, a steady state gesture in which the hand 120 does not move (thus making detection via the ultrasound sensor 111 difficult) may include the hand 120 remaining motionless but having a particular number of fingers extended (e.g., two fingers extended) to indicate a selection of a particular menu item (e.g., the second item from the top). Detectable gestures may also include periodic or repeated gestures (e.g., the hand 120 being waved back and forth).

In a particular embodiment, all or a portion of the modules 112, 114, and/or 118 may be implemented using processor-executable instructions that may be executed by a hardware processor, as further described with reference to FIG. 5. In a particular embodiment, all or a portion of the modules 112, 114, and/or 118 may be implemented using hardware, such as via dedicated circuitry, a controller, one or more other hardware devices, or any combination thereof.

In a particular embodiment, the gesture detection module 118 may apply a complementary voting scheme to determine what gesture is detected. The complementary voting scheme may be at least partly based on gesture complexity. For example, when both the ultrasound sensor 111 and the camera 113 identify the same gesture, the same gesture may be selected as the output gesture. When the ultrasound sensor 111 and the camera 113 identify different gestures, the gesture having the higher confidence score may be selected as the output gesture. As another example, when the ultrasound sensor 111 and the camera 113 identify gestures of varying complexity, the more complex gesture may be selected as the output gesture. A particular example of a complementary voting scheme is further described with reference to FIG. 3.

In a particular embodiment, the electronic device 110 may include a light detector (e.g., a light detector 115 internal to the camera 113 or a light detector 116 external to the camera 113). The light detector 115 or 116 may determine an ambient lighting level. Based on the lighting level and/or a gesture range (e.g., how close the hand 120 is to the electronic device 110, as measured by the ultrasound sensor 111 and/or the camera 113), portions of the ultrasound sensor 111 and/or the camera 113 may be selectively deactivated. To illustrate, when lighting conditions are poor and the light detector 115 or 116 determines a low lighting level, all or a portion of the camera 113 and the image processing/control module 114 may be deactivated to conserve power, because the camera 113 may not accurately detect motion in dark or near-dark conditions. The light detector 115 or 116 may remain activated to detect changes in the lighting conditions.

As another example, when the ultrasound sensor 111 detects that the hand 120 is located in a particular location, the camera 113 may utilize such information to identify an area of interest. A portion of a sensor array in the camera 113 that corresponds to the area of interest may be activated while other portions or the remainder of the sensor array may be deactivated to conserve power.

To implement such functionality, data may be exchanged between the ultrasound processing/control module 112 and the image processing/control module 114, illustrated as a data exchange 117. For example, the ultrasound sensor 111 and the camera 113 may format their respective outputs in accordance with a common data model or an application programming interface (API), so that other sensors and processing/control modules may successfully interpret the output. Data exchanged in accordance with the common data model may include output from the ultrasound sensor 111, output from the camera 113, data related to a range (i.e., distance) of the hand 120 from the ultrasound sensor 111 or the camera 113, data related to a position of the hand 120 relative to the ultrasound sensor 111 or the camera 113, data associated with an active configuration of the ultrasound sensor 111 (e.g., signal emission frequency, signal emission periodicity, signal emission direction, etc.) or the camera 113 (e.g., image capture mode, focal length, area of focus, etc.), or any combination thereof. Each of the signal processing/control modules 112 and 114 may also be configured to detect false positives (e.g., a detected gesture where no gesture actually exists) based on data received from the other of the processing/control modules 112 and 114.

Figure 6:
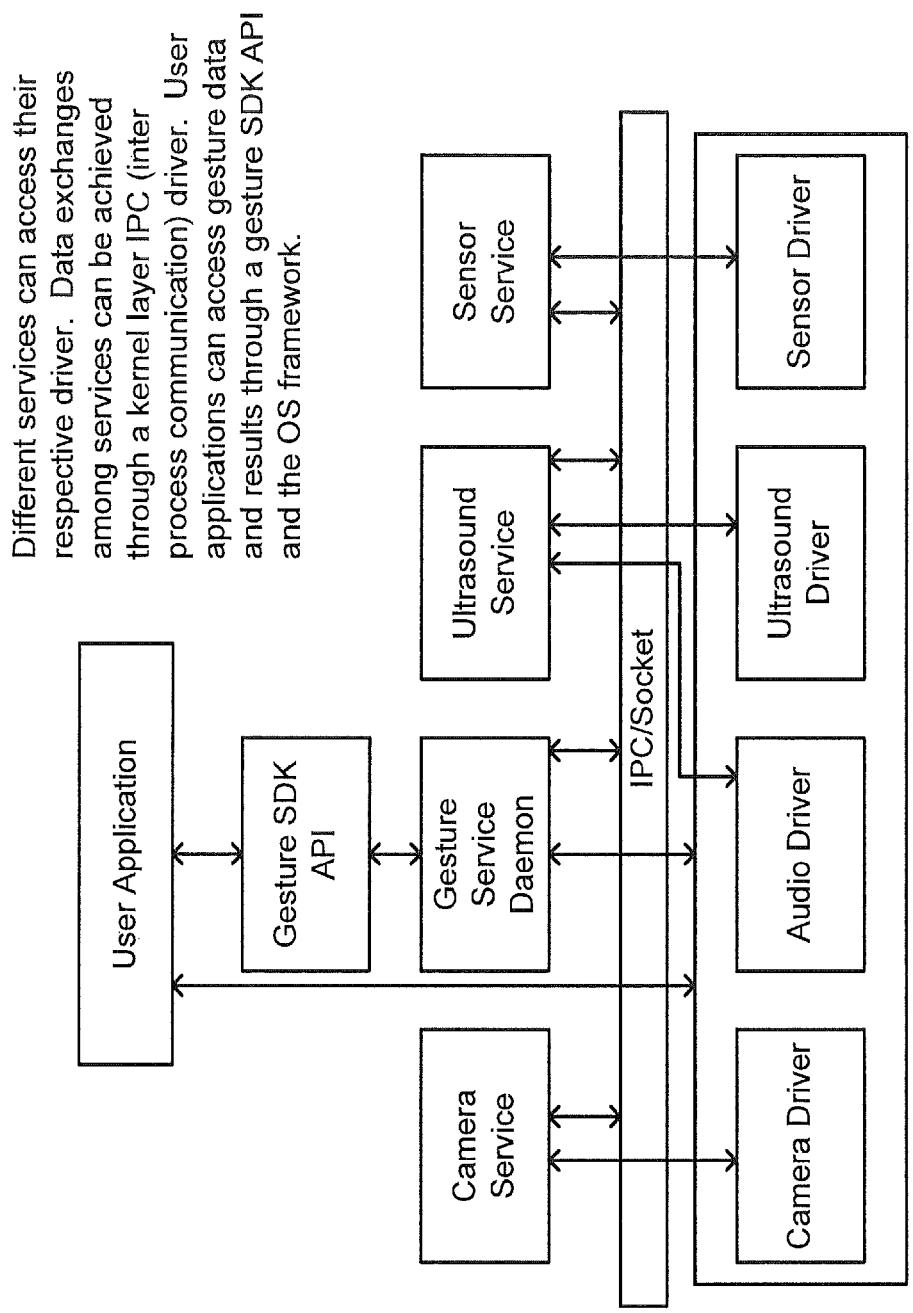
FIG. 6 is a block diagram to illustrate a particular embodiment of implementing data exchange associated with gesture detection.
Figure 7:
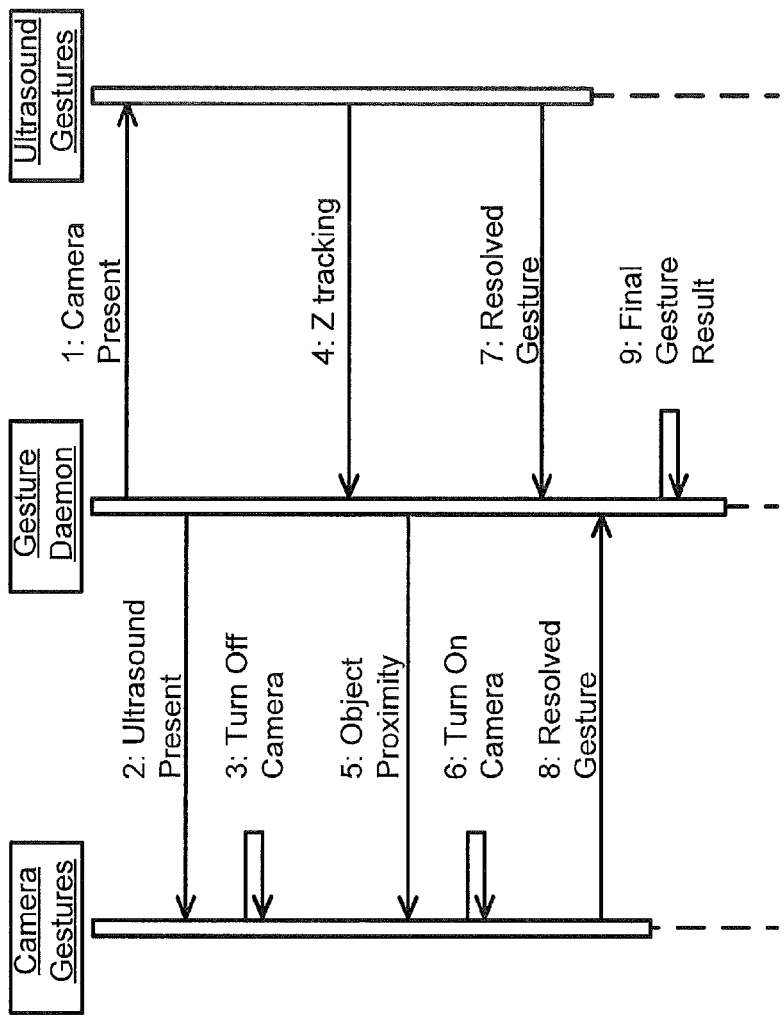
FIG. 7 is a diagram to illustrate a particular embodiment of data exchange associated with gesture detection.

When data exchange between the processing/control modules 112 and 114 is enabled, each of the sensors 111 and 113 may self-adjust based on information from the other of the sensors 111 and 113. Moreover, such self-adjustment may be independent of a processor (e.g., application processor) of the electronic device 110. To illustrate, the ultrasound sensor 111 may self-adjust an active configuration, a signal emission frequency, a signal emission direction, or any combination thereof, based on output from the camera 113. The camera 113 may self-adjust an active configuration, a focal length, an area of focus, or any combination thereof, based on output from the ultrasound sensor 111. Thus, each of the sensors 111 and 113 may be configured to improve its own performance, via self-adjustment, without being instructed to do so by a central processor or controller. A particular example of a framework to implement data exchange is illustrated in FIG. 6. An example of data exchange between a camera and an ultrasound sensor using a gesture daemon is illustrated in FIG. 7.

During operation, the gesture detection module 118 may identify gestures made by the hand 120 based on outputs from one or more of the ultrasound sensor 111 and the camera 113. For example, when the lighting level determined by the light detector 115 or 116 is less than a lighting threshold (e.g., it is too dark for the camera 113), the camera 113 may be deactivated and gesture detection may be performed based on output from the ultrasound sensor 111. When the lighting level is greater than or equal to the lighting threshold, gesture detection may depend on a gesture range. To illustrate, when the gesture range is less than a nearness threshold (e.g., the hand 120 is too close for the camera 113), the camera 113 may be deactivated and gesture detection may be performed based on output from the ultrasound sensor 111. When the gesture range is greater than a farness threshold (e.g., the hand 120 is too far for the ultrasound sensor 111), the ultrasound sensor 111 may be deactivated and gesture detection may be performed based on output from the camera 113. When the gesture range is between the nearness and farness thresholds, gesture recognition may be performed based on output from both of the sensors 111 and 113, in accordance with a complementary voting scheme.

The system 100 of FIG. 1 may thus enable gesture detection based on information from multiple types of sensors. It will be appreciated that by leveraging different types of sensors, the system 100 of FIG. 1 may provide greater gesture detection accuracy than single-sensor type systems (e.g., due to reduction of incorrect gestures and false positives). It will also be appreciated that the system 100 of FIG. 1 may conserve power by selectively deactivating sensors or portions thereof based on lighting and proximity information, and may attempt to self-improve performance based on data exchanged between sensor paths.

Figure 2:
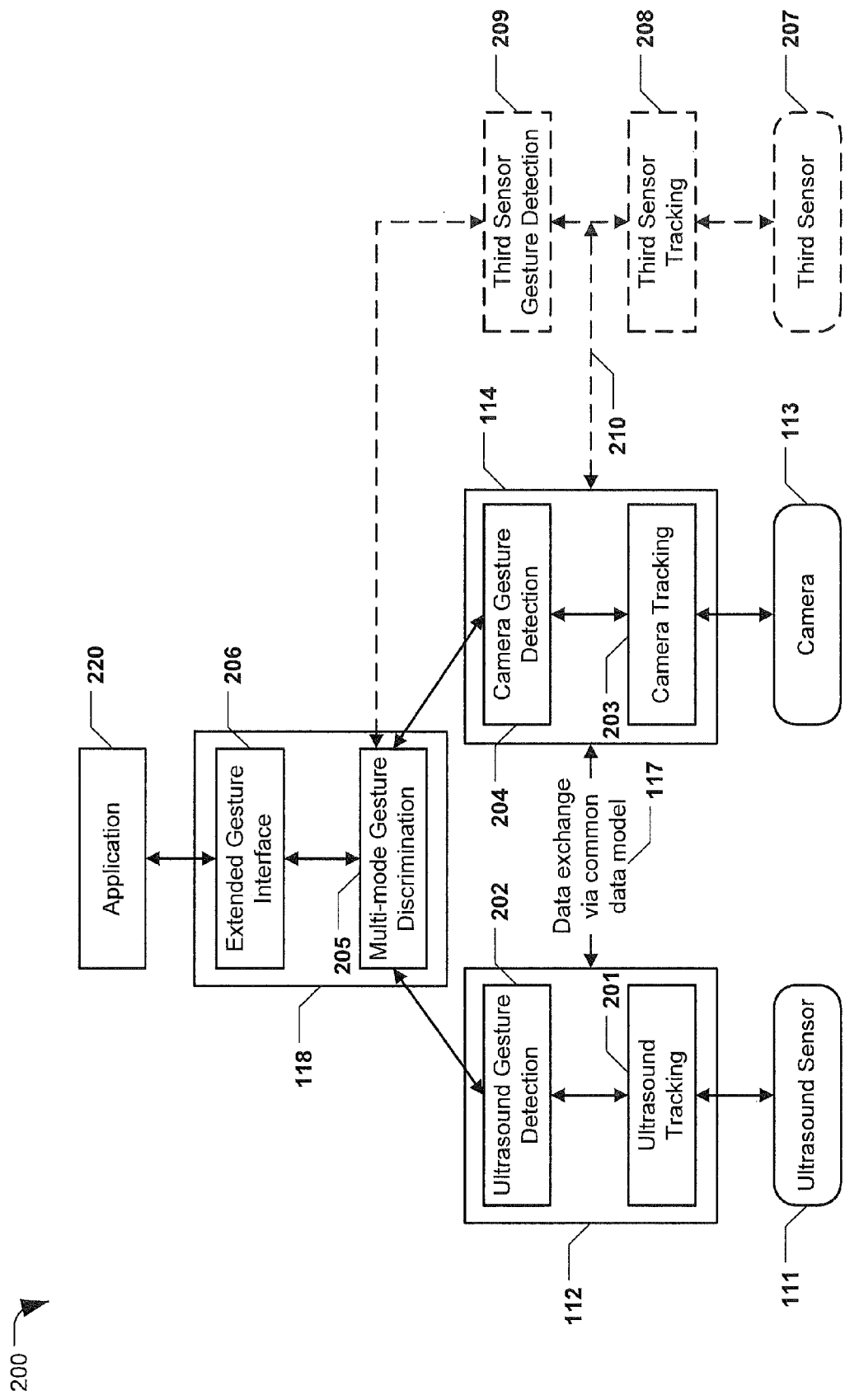
FIG. 2 is a diagram of another particular embodiment of a system operable to perform gesture detection based on information from multiple types of sensors.

FIG. 2 is a diagram of another particular embodiment of a system 200 operable to perform gesture detection based on information from multiple types of sensors. The system 200 includes the ultrasound sensor 111, the camera 113, the ultrasound processing/control module 112, the image processing/control module 114, and the gesture recognition module 118 of FIG. 1. Further, the ultrasound processing/control module 112 and the image processing/control module 114 may be configured to exchange data via a common data model, illustrated as the data exchange 117 described with reference to FIG. 1.

In a particular embodiment, the modules 112, 114, and 118 may include one or more sub-modules. For example, the ultrasound processing/control module 112 may include an ultrasound tracking module 201 and an ultrasound gesture detection module 202. The ultrasound tracking module 201 may be configured to track motion of one or more objects (e.g., the hand 120 of FIG. 1) based on time of flight information associated with an emitted ultrasound signal and reflection(s) of the emitted ultrasound signal. The ultrasound gesture detection module 202 may determine whether tracking data produced by the ultrasound tracking module 201 represents a recognizable gesture, and if so, determine a confidence level associated with the recognizable gesture. Similarly, the image processing/control module 114 may include a camera tracking module 203 and a camera gesture detection module 204. The camera tracking module 203 may output image tracking data. The camera gesture detection module 204 may determine whether the image tracking data represents a recognizable gesture, and if so, determine a confidence level associated with the recognizable gesture. It should be noted that a set of gestures recognizable via the ultrasound sensor 111 may be different than a set of gestures recognizable via the camera 113.

The gesture detection module 118 may include a multi-mode gesture discrimination module 205. For example, the multi-mode gesture discrimination module 205 may apply a complementary voting scheme to the outputs of the ultrasound gesture detection module 202 and the camera gesture detection module 204, as further described with reference to FIG. 3. The gesture detection module 118 may also include an extended gesture interface 206 configured to output results of the multi-mode gesture discrimination module 205 in a standardized format to one or more applications, such as an illustrative application 220.

In a particular embodiment, the system 200 may optionally include more than two types of sensors. For example, the system 200 may include a third sensor 207 having a third sensor type that is different from ultrasound and camera. A signal path of the third sensor 207 may include a third sensor tracking module 208 and a third sensor gesture detection module 209, and output of the third sensor gesture detection module 209 may be provided to the complementary voting scheme applied by the multi-mode gesture discrimination module 205. Data may be exchanged between the data path of the third sensor and data paths of other sensors, indicated as another data exchange 210. The system of 200 may thus provide an extensible framework to implement multi-mode gesture recognition and data exchange.

Figure 3:
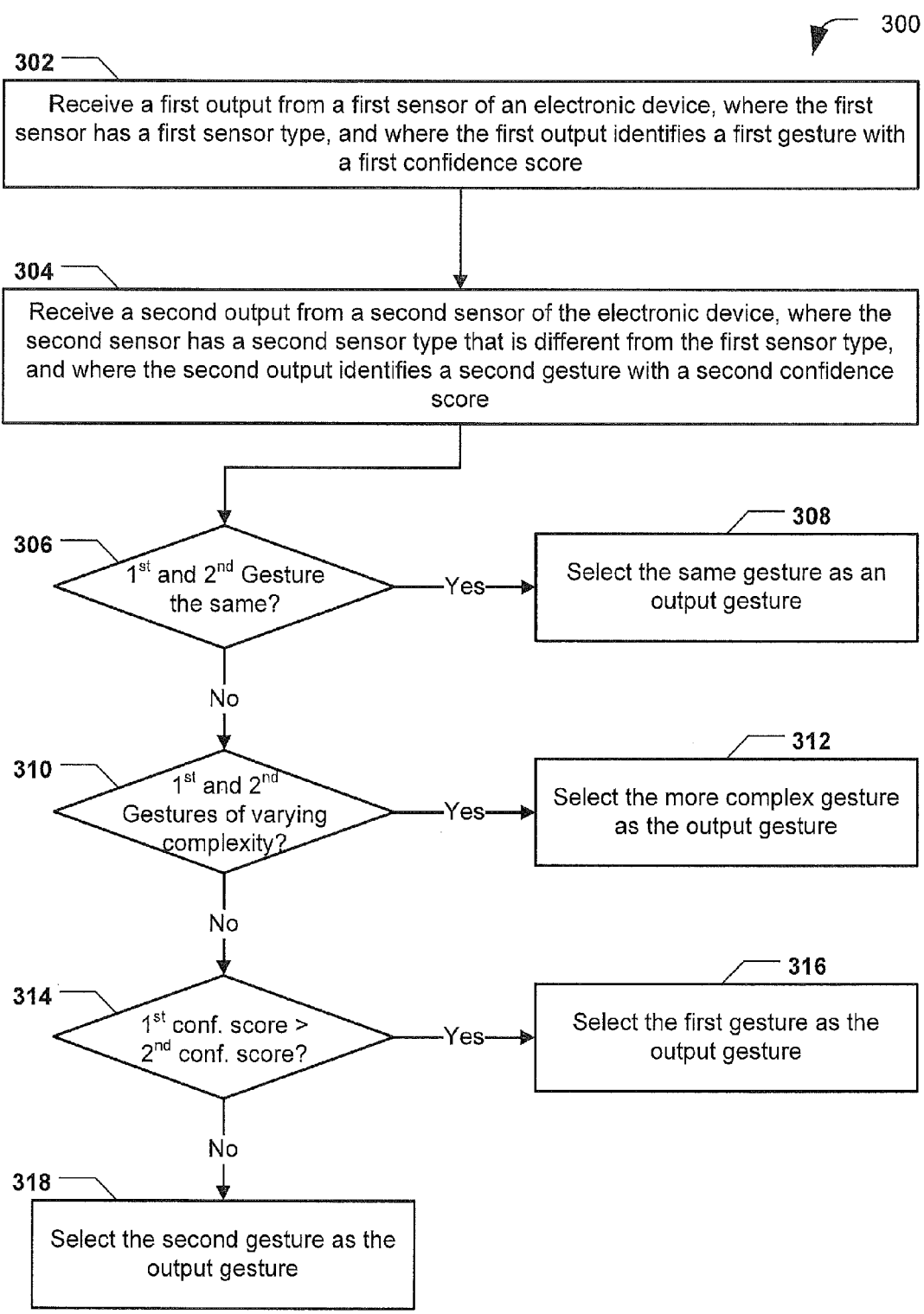
FIG. 3 is a flowchart of a particular embodiment of method of performing gesture detection via application of a complementary voting scheme to information from multiple types of sensors.

FIG. 3 is a flowchart of a particular embodiment of a method 300 of performing gesture detection via application of a complementary voting scheme to information from multiple types of sensors. In an illustrative embodiment, the method 300 may be performed by the gesture detection module 118 of BIG. 1 or the multi-mode gesture discrimination module 205 of FIG. 2.

The method 300 may include receiving a first output from a first sensor of an electronic device, at 302. The first sensor may have a first sensor type and the first output may identify a first gesture with a first confidence score. The method 300 may also include receiving a second output from a second sensor of the electronic device, at 304. The second sensor may have a second sensor type that is different from the first sensor type, and the second output may identify a second gesture with a second confidence score. For example, in FIG. 1, gesture detection module 118 may receive first output from the ultrasound sensor 111 via the ultrasound processing/control module 112 and second output from the camera 113 via the image processing/control module 114.

The method 300 may further include determining whether the first and second gestures are the same, at 306. When it is determined that the first and second gestures are the same (i.e., both sensors identified the same gesture), the method 300 may include selecting the same gesture as an output gesture, at 308. When it is determined that the first and second gestured are different, the method 300 may include determining whether the first and second gestures vary in complexity, at 310. When the first and second gestures vary in complexity (e.g., one of the sensors identified a simple gesture but the other sensor identified a complex gesture), the method 300 may include selecting the more complex gesture as the output gesture, at 312. To illustrate, referring to FIG. 1, when ultrasound detection identifies a simple "up" gesture but camera detection identifies a more complex "two fingers extended" gesture, the gesture detection module 118 may select the more complex "two fingers extended" gesture as the output gesture.

When it is determined that the first and second gestures have the same complexity, the method 300 may include determining whether the first confidence score is greater than the second confidence score, at 314. When is determined that the first confidence score is greater than the second confidence score, the method 300 may include selecting the first gesture as the output gesture, at 316. When is determined that the first confidence score is not greater than the second confidence score, the method 300 may include selecting the second gesture as the output gesture, at 318.

The method 300 of FIG. 3 may thus enable detection of gestures based on applying a complementary voting scheme to the outputs of multiple types of sensors, which may provide increased gesture recognition accuracy when compared to single-sensor type systems.

Figure 4:
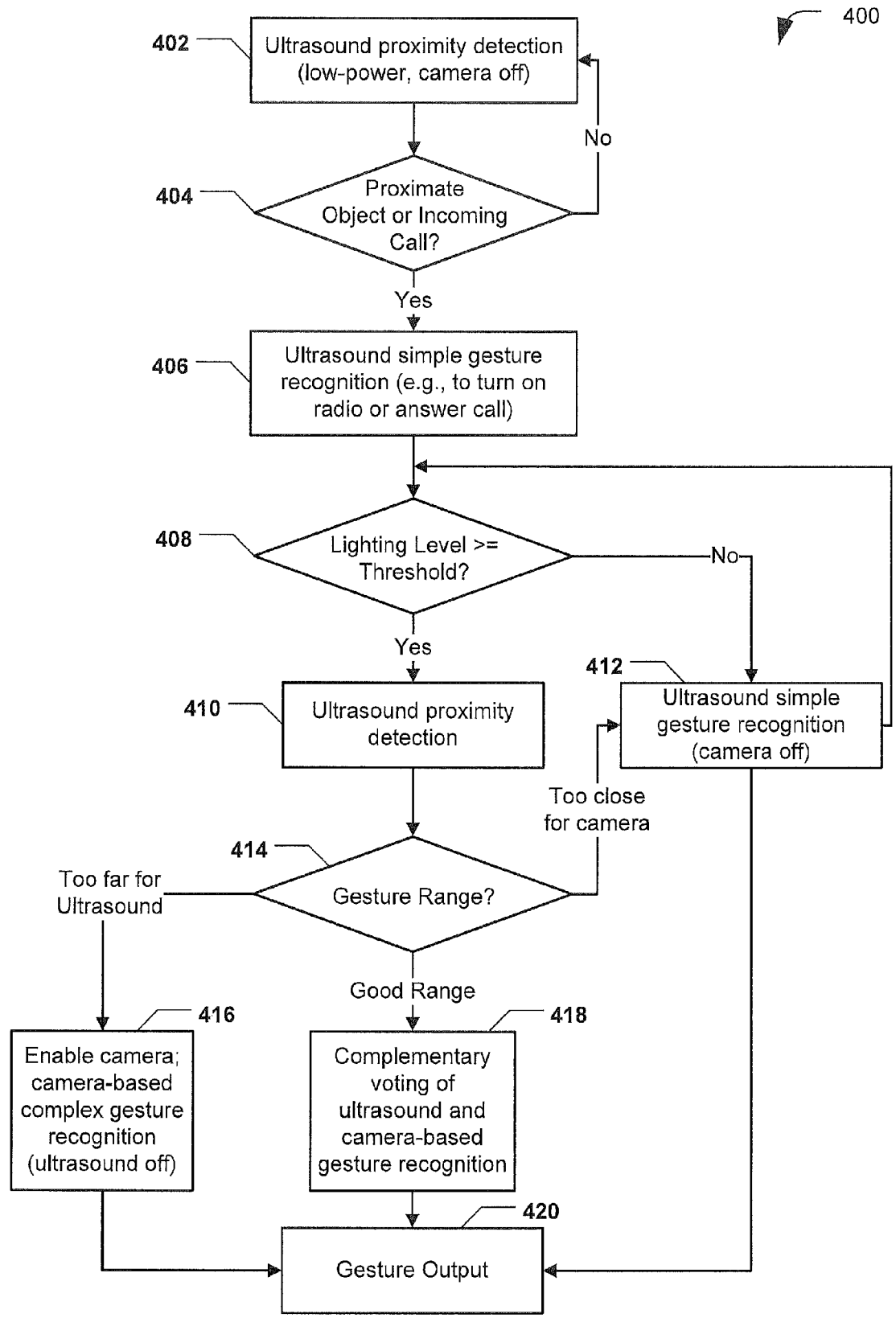
FIG. 4 is a flowchart of a particular embodiment of a method of operation at the system of FIG. 1.

FIG. 4 is a flowchart of a particular embodiment of a method 400 of operation of a gesture recognition system that includes an ultrasound sensor and a camera. For example, the method 400 of FIG. 4 may describe operations of the electronic device 110 of FIG. 1 (e.g., a mobile phone) during in-car hands-free operation.

The method 400 may include performing ultrasound proximity detection, at 402. Ultrasound proximity detection may represent a low-power front end that selectively wakes up remaining portions of a device. A camera of the device may be off while performing the ultrasound proximity detection. For example, in FIG. 1, proximity detection may be performed via the ultrasound sensor 111 while the camera 113 is off. The method 400 may also include determining whether a proximate object is detected or an incoming call is received, at 404. Until the ultrasound sensor detects a proximate object or until an incoming call is received, the method 400 may iterate by returning to 402.

When a proximate object is detected or an incoming call is received, the method 400 may include enabling ultrasound-based simple gesture recognition, at 406. For example, referring to FIG. 1, such simple gesture recognition may be used to turn on a radio of the electronic device 110 or to answer an incoming call. The method 400 may include determining whether a lighting level is greater than or equal to a lighting threshold, at 408. For example, in FIG. 1, the light detector 115 or 116 may determine a lighting level and the image processing/control module 114 may determine whether the lighting level is greater than or equal to a lighting threshold.

In response to determining the lighting level less than the lighting threshold, the method 400 may include performing ultrasound simple gesture recognition and disabling all or a portion of the camera, at 412, and outputting detected gesture(s), at 420. Illustrative examples of when the lighting level may be less than the lighting threshold include in-car operation at night or while the car is in a tunnel.

In response to determining that the lighting level is greater than or equal to the lighting threshold, the method 400 may include performing ultrasound proximity detection, at 410, and determining a gesture range, at 414. For example, in FIG. 1, a gesture range may be determined based on output from the ultrasound sensor 111 and/or the camera 113. When it is determined that the gesture range is too far for ultrasound (e.g., greater than a farness threshold), the method 400 may include enabling the camera and performing camera-based complex gesture recognition, at 416, and outputting detected gesture(s), at 420. The ultrasound sensor or a portion thereof may be disabled while the gesture range remains too far for ultrasound.

When it is determined that the gesture range is too close for the camera (e.g., less than a nearness threshold), the method 400 may include disabling at least a portion of the camera and performing ultrasound-based simple gesture recognition, at 412, and outputting detected gesture(s), at 420. When it is determined that the gesture range is acceptable for both ultrasound and the camera (e.g., the gesture range is between the nearness and farness thresholds), the method 400 may include performing gesture recognition via application of a complementary voting scheme to the outputs of the ultrasound sensor and the camera, at 418, and outputting detected gesture(s), at 420.

The method 400 of FIG. 4 may thus enable in-car hands-free operation of an electronic device based on information from multiple types of sensors (i.e., ultrasound and camera). However, it should be noted that the scenario of in-car hands-free mobile phone operation is provided for illustration only. Other applications include, but are not limited to, in-car gesture control for in-car entertainment or navigation, living room media control, gaming, in-kitchen appliance control, multimedia presentation control, gym/exercise equipment control, etc. Moreover, the systems and methods of the present disclosure may be run on platforms other than mobile phones, such as embedded devices, netbook computers, tablet computers, laptop computers, media centers, set-top boxes, "smart" appliances, game consoles, etc.

In particular embodiments, the methods 300 and 400 of FIGS. 3 and 4 may be implemented by a field-programmable gate array (FPGA) device, an application-specific integrated circuit (ASIC), a processing unit such as a central processing unit (CPU), a digital signal processor (DSP), a controller, another hardware device, a firmware device, or any combination thereof. As an example, the methods 300 of FIG. 3 and 400 of FIG. 4 can be performed by a processor that executes instructions, such as described with respect to FIG. 5.

Figure 5:
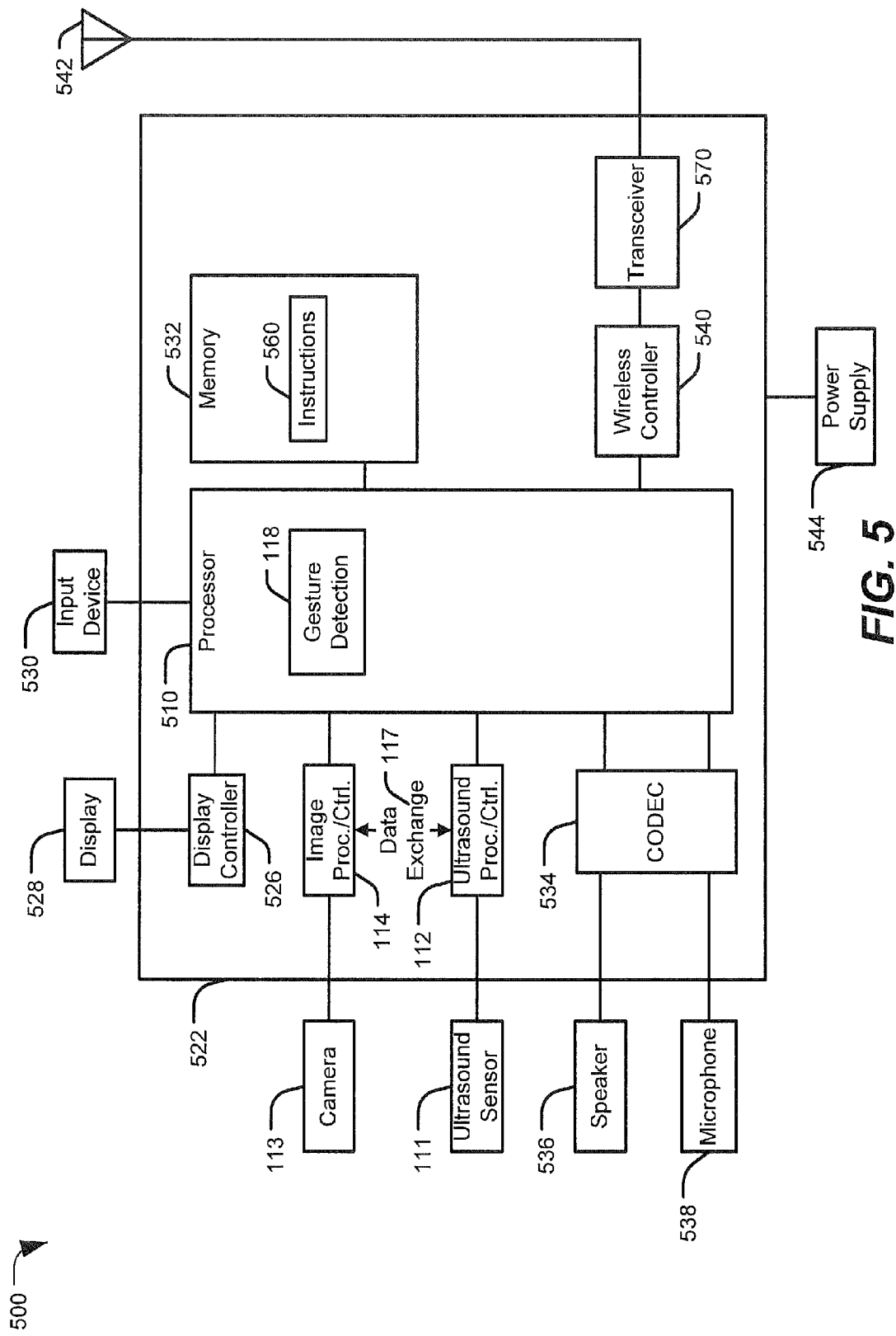
FIG. 5 is a block diagram of a wireless device operable to perform gesture recognition based on information from multiple types of sensors in accordance with the described embodiments.

Referring to FIG. 5, a block diagram of a particular illustrative embodiment of a wireless communication device is depicted and generally designated 500. In an illustrative embodiment, all or a portion of the device 500 may include, be included within, or otherwise be used to implement all or a portion of the electronic device 110 of FIG. 1. The device 500 includes a processor 510, such as a digital signal processor (DSP), coupled to a memory 532. The memory 532 may include instructions 560 executable by the processor 510 to perform the methods and process disclosed herein, such as the method 300 of FIG. 3 and the method 400 of FIG. 4.

FIG. 5 also shows a display controller 526 that is coupled to the processor 510 and to a display 528. A coder/decoder (CODEC) 534 can also be coupled to the processor 510. A speaker 536 and a microphone 538 can be coupled to the CODEC 534.

The ultrasound sensor 111 may be coupled to the processor 510 via the ultrasound processing/control module 112 (illustrated as being implemented via hardware), as shown. The camera 113 may be coupled to the processor 510 via the image processing/control module 114 (illustrated as being implemented via hardware), as shown. Information from the modules 112 and 114 may be used by the gesture recognition module 118 (illustrated as being implemented via software executed by the processor 510) to detect gestures. In a particular embodiment, the gesture detection module 118 may apply a complementary voting scheme to information received from the modules 112 and 114. In a particular embodiment, the modules 112 and 114 may be configured to exchange data in accordance with a common data model or an API, illustrated as the data exchange 117. For example, such data exchange may enable one or both of the ultrasound sensor 111 and the camera 113 to self-adjust, independent of the processor 510, in an effort to improve performance. Based on data from the sensors 111 and/or 113, all or a portion of the sensors 111, 113, and/or the modules 112, 114 may be selectively deactivated to conserve power.

FIG. 5 also indicates that a wireless controller 540 can be coupled to the processor 510 and to a transceiver 570 that is coupled to a wireless antenna 542. In a particular embodiment, the processor 510, the display controller 526, the memory 532, the CODEC 534, the wireless controller 540, the modules 112 and 114, and the transceiver 570 are included in a system-in-package or system-on-chip device 522. In a particular embodiment, an input device 530 and a power supply 544 are coupled to the system-on-chip device 522. Moreover, in a particular embodiment, as illustrated in FIG. 5, the display 528, the input device 530, the speaker 536, the microphones 538, the sensors 111 and 113, the wireless antenna 542, and the power supply 544 are external to the system-on-chip device 522. However, each of the display 528, the input device 530, the speaker 536, the microphones 538, the sensors 111 and 113, the wireless antenna 542, and the power supply 544 can be coupled to a component of the system-on-chip device 522, such as an interface or a controller.

In a particular embodiment, a device (e.g., a mobile wireless device or component thereof) may implement freeform gesture recognition. Freeform gesture recognition may be operable to recognize a particular set of gestures. For example, freeform gesture recognition may be used to recognize left, right, and select gestures at an effective distance of up to about ten centimeters. In a particular embodiment, freeform gesture recognition may involve use of a gesture library and a supporting ultrasound framework (e.g., a library of functions, modules, and/or algorithms running on or provided by a DSP).

Freeform gesture detection may be implemented using a plurality of processes that for ease of description are described herein as corresponding to separate functional blocks. The functional blocks may include: a main gesture detection block, a motion activity detection (MAD) block, a full-power proximity detection block, an on/off switch for full-power mode, and an interference detection and cancellation block. One or more of the functional blocks may be implemented using ultrasound. Ultrasound based gesture detection blocks may function similarly to sonar or radar. For example, an ultrasound transmitter may transmit continuous broadband ultrasound signals. The ultrasound signals reflected from a user's hand may be detected by multiple spatially separated microphones. Time of flight and other timing features may be used to identify the hand gesture. In contrast to other systems, no gesture training may be needed for gesture recognition. The MAD block may be used to detect object movement within a certain distance. A MAD flag may be used to indicate a change with respect to a captured snapshot of a background channel image (e.g., via averaging frames). The snapshot may be used together with a proximity flag to switch a detection algorithm on/off (e.g., to reduce false positives). The range and sensitivity of the freeform gesture detection may be adjusted by control parameters. The interference detection block may detect offending (e.g., interfering) ultrasound sensor frequencies in a frequency domain and may cancel effects of such frequencies.

In a particular embodiment, low-power proximity sensing or detection may be implemented. For example, low-power proximity sensing may include transmitting low duty cycle ultrasound signals, detecting a proximity event, and "waking up" a full-power mode gesture or hover detection module of a DSP. Particular examples of low-power proximity detection are further described with reference to FIGS. 8 and 10-13.

A mobile ultrasound framework may support switching between low-power and full-power modes. In some implementations, analog microphone(s) may also be supported. In a particular embodiment, multi-modal (e.g., multiple sensor type) framework support may be included. The multi-modal framework may enable independent gesture recognition systems (e.g., camera, ultrasound, infrared, etc.) to share information (e.g., in accordance with a common data model) to improve gesture recognition accuracy. Hovering detection may also be implemented to detect slow moving finger coordinates at an effective distance of one to three centimeters from a screen.

Figure 8:
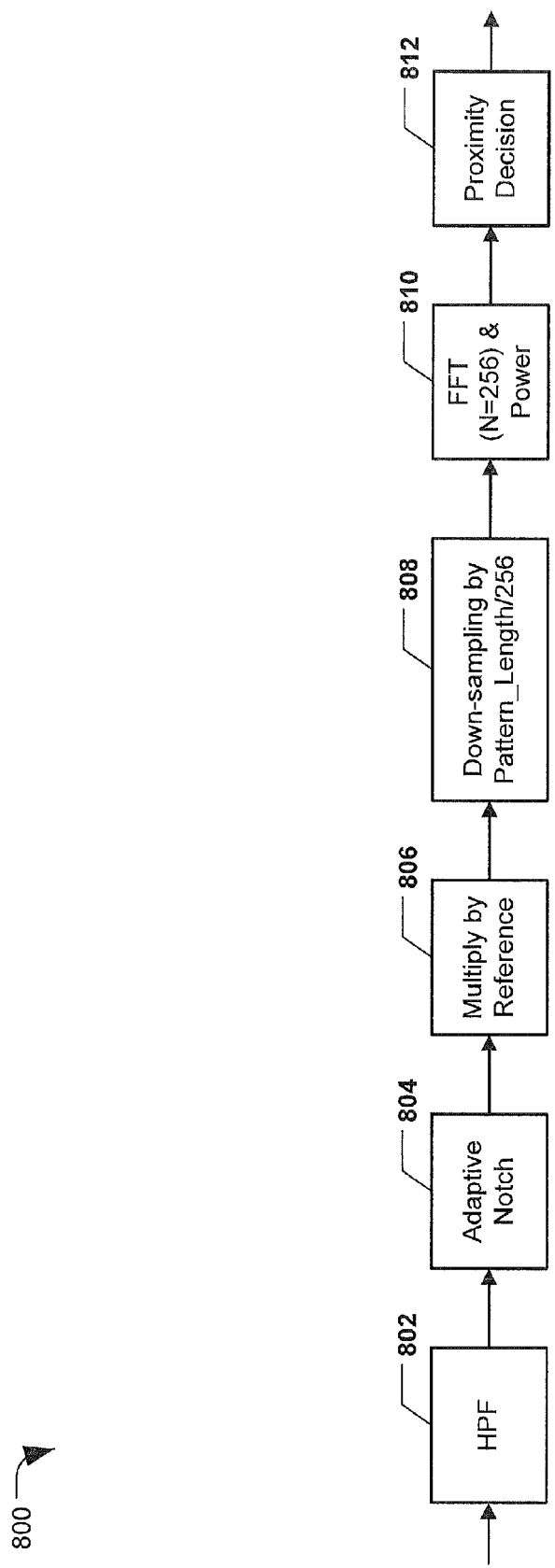
FIG. 8 is a diagram of a particular embodiment of a low-power proximity detection system.

In a particular embodiment, low-power proximity detection may detect and differentiate between the following conditions: 1) when something covers a speaker/microphone (e.g., when the device is in a pocket or pushed tightly against an ear); 2) when something is a short distance above a speaker/microphone (e.g., when a hand is waving a short distance away or when the device being pushed loosely against an ear); and 3) when nothing is above the speaker/microphone within a particular distance (e.g., corresponding to an idle or no action period). FIG. 8 illustrates a particular example of a low-power proximity detection system, and is generally designated 800. The system 800 includes a high pass filter (HPF) 802, an adaptive notch filter 804, a multiplier 806, a down-sampler 808, a transform module 810, and a proximity detection module 812, as shown. A signal received by the system 800 may be a linear sweep or another wideband continuous ultrasound wave. FM demodulation (down mixing) may include multiplication of a transmitted signal frame and a received signal frame. Low pass filtering may remove a high frequency portion of the demodulated signal to generate a baseband signal. A fast Fourier transform (FFT) may be performed to generate phase delay infatuation, and range or proximity measurement may be performed based on FFT peaks or spectrum pattern.

Various gesture detection functions, modules, and algorithms described herein may be implemented (e.g., by a DSP) in one or more gesture libraries. Applications, including third-party applications, may call into the gesture libraries to incorporate gesture detection features. The described techniques may thus provide a gesture detection framework that application developers may leverage to enhance user experience. The gesture detection framework may also be used by mobile device vendors and operating systems to improve core user experience.

In a particular embodiment, full-power gesture detection may include near swipe gesture detection to detect simple swipe gestures near a device surface. For example, user hands in different poses with arbitrary angles, as well as finger swipes, may be detected. Near swipe gestures may include left, right, and select gestures approximately five to ten centimeters from the device surface. To illustrate, a left or right gesture may be represented by the user's hand or finger moving quickly from left to right, right to left, clockwise, or counterclockwise in parallel or vertical to the device surface (e.g., screen). A select or deselect gesture may be represented by the user's hand being extended away from the user's body and moving in a normal speed towards the screen, followed by staying in a particular location for a particular period of time (e.g., half a second), and then moving away from the device. A configurable delay may be implemented before the next gesture is enabled. By using such near swipe gesture detection, an application may obtain a detected gesture (e.g., left, right, select) via a key event or a touch event that is translated by framework software. An ultrasound framework may map specific user events received from a gesture library to a corresponding high-level operating system (HLOS) input event or may output raw data via an API.

Full-power gesture detection may also include support for audio and gesture concurrency, in which audio may be played back from one or more speakers in stereo mode. Playback may be switched to a headset or to a high-definition multimedia interface (HDMI) connection (e.g., when the mobile device is connected to a television). Hot swapping back and forth may be supported. In a particular embodiment, if a speakerphone supports audio and ultrasound signal output, ultrasound signals may be output for gesture detection even while audio signals are being output. For example, a user may listen to a song using one or more speakers of a mobile device while the same one or more speakers output ultrasound signals, thereby enabling the user to control the music output via gestures (e.g., rewind, fast-forward, pause, next song, previous song, raise volume, lower volume, etc.).

In a particular embodiment, low-power proximity detection may detect hands near a device surface, covering the device, or moving across the device surface. A proximal detection distance (e.g., five to ten centimeters) may act as a control parameter for the proximity detection. Examples of use for such proximity detection may include determining whether to turn on full-power mode applications, such as gesture, hover, camera gesture, etc. In a particular embodiment, proximity detection may activate a wake-up event flag in response to detecting that a user's hand is covering the device, has moved near a speaker/microphone, etc. By using such proximity detection, an application may obtain proximity detection notification via a key event or a touch event translated by framework software. An ultrasound framework may map received user events and turn on full-power gesture recognition in response to low-power proximity detection.

In a particular embodiment, a gesture detection framework may be robust enough to support certain user parameter values. For example a supported velocity parameter (e.g., how fast a gesture can move but still be recognized) may be 2-20 Hz. An operating distance parameter (e.g., how far or close the user can be from a sensor) may be 5-10 cm. A failure rate parameter may be 50-150 per thousand. A gesture intuitiveness parameter (e.g., how easy it is for a user to learn how to perform a "correct" gesture) may be that 90% of users are able to perform a correct gesture after reading setup instructions.

The framework may also be robust enough to support certain system parameter values. For example, a 40 millisecond response time may be supported. The response time may correspond to how much time can elapse between a user initiating an action and an expected result being achieved (e.g., a latency between completing a gesture and observing an effect). In a particular embodiment, low-power proximity detection may be performed at a DSP of a mobile device on a 25% duty cycle, and full-power gesture detection may be performed on a CPU of the mobile device, where the CPU consumes approximately 60 times as much power as the DSP. In a particular embodiment, the system may be designed such that transducers do not introduce high level nonlinear effects on a transmit path. Moreover, gesture detection may work even in the presence of interference, such as from wireless (e.g., Institute of Electrical and Electronics (IEEE) 802.11) beacon signals and other devices (e.g., when an ultrasound stylus is placed near the device or when multiple devices are operating in close proximity).

It should be noted that although ultrasound detection may operate in low-light and no-light scenarios, certain types of lights may generate ultrasound band noise. Thus, the system may function such that ultrasound noise emitted by such lights does not saturate the transmit path. In certain situations, audio band noise, wind noise, and/or turbulence may cause microphone saturation and generate a nonlinear effect. Thus, the system may be robust enough to support gesture detection under such noise conditions. The system may also be robust enough to support various stabilities. For example, although relative movement of the device and background may cause false detection, the system may support gesture detection even when moderate amount of relative movement between a user's hand and the device exists.

In a particular embodiment, a transition sequence between full-power gesture detection and low-power proximity detection may be as follows. A gesture manager may be responsible for starting and stopping different gesture detection sources based on a mode of operation, which may be determined at the application level and/or the system level. The gesture manager may start ultrasound low-power proximity detection. The ultrasound low-power proximity detection may notify the gesture manager of a proximity event. The gesture manager may stop the ultrasound low-power proximity detection and may start full-power ultrasound/camera gesture detection. The full-power ultrasound/camera gesture detection may notify the gesture manager of gesture events. When the full-power ultrasound/camera gesture detection times out, the gesture manager may stop the full-power ultrasound/camera gesture detection and may restart the ultrasound low-power proximity detection.

In a particular embodiment, a switching mechanism between low-power and full-power modes may be implemented by an application processor (e.g., CPU) based on a state of the full-power module(s) and other concurrent application events. For example, a low-power mode (e.g., a low power proximity detection mode) may be entered when a display screen is turned off. Low-power mode may also be entered when full-power gesture detection sends a "switch off" command. In response to the "switch off" command, a device may wait for a period of time (e.g., 1-2 minutes) and then transition into the low-power mode if the full-power gesture detection has not sent a "switch on" command A low-power proximity detection event may also trigger full-power gesture/hover/camera detection.

In some implementations, a delay may be associated with low-power proximity detection. Thus, several separate steps may be performed to complete a transition from the low-power mode to the full-power mode. Initially, a hand may cover or move near the device to trigger the low-power proximity detection. The full-power mode may be entered with user feedback (e.g., visual feedback). A follow-on gesture may be detected in the full-power mode. Alternately, or in addition, if a phone call is received, the device may switch to the full-power mode.

Figure 9:
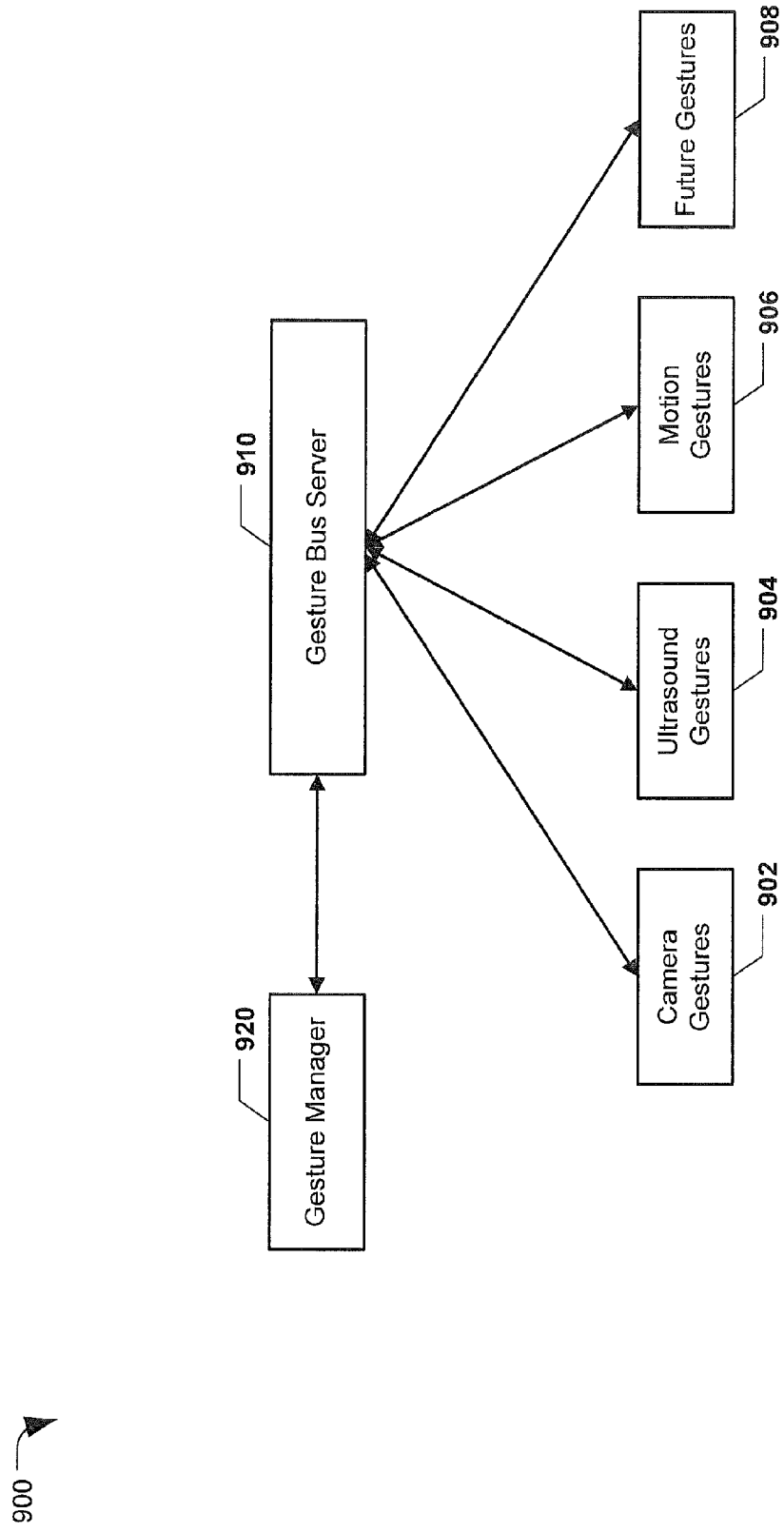
FIG. 9 is a diagram of a particular embodiment of a multi-modal gesture detection system.

FIG. 9 illustrates a particular embodiment of a multi-modal gesture detection system, and is generally designated 900. As shown in FIG. 9, gesture detection input from various sources (e.g., camera gestures 902, ultrasound gestures 904, motion gestures 906, gestures from one or more additional gesture sources 908, etc.) may be communicated to a gesture manager 920 via a gesture bus server 910. In a particular embodiment, messages may be communicated by the gesture bus server 910 using socket communications for inter-process communication (IPC). The system 900 of FIG. 9 may support both on-target as well as off-target gesture sources.

Figure 10:
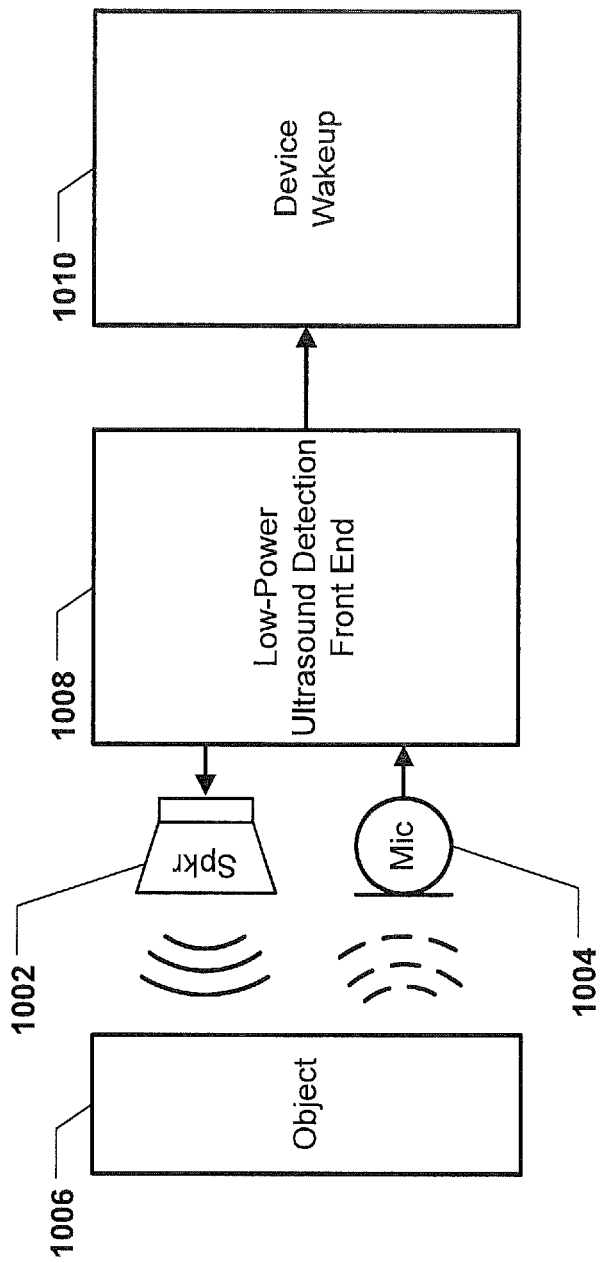
FIG. 10 is a diagram of another particular embodiment of a low-power proximity detection system.
Figure 11:
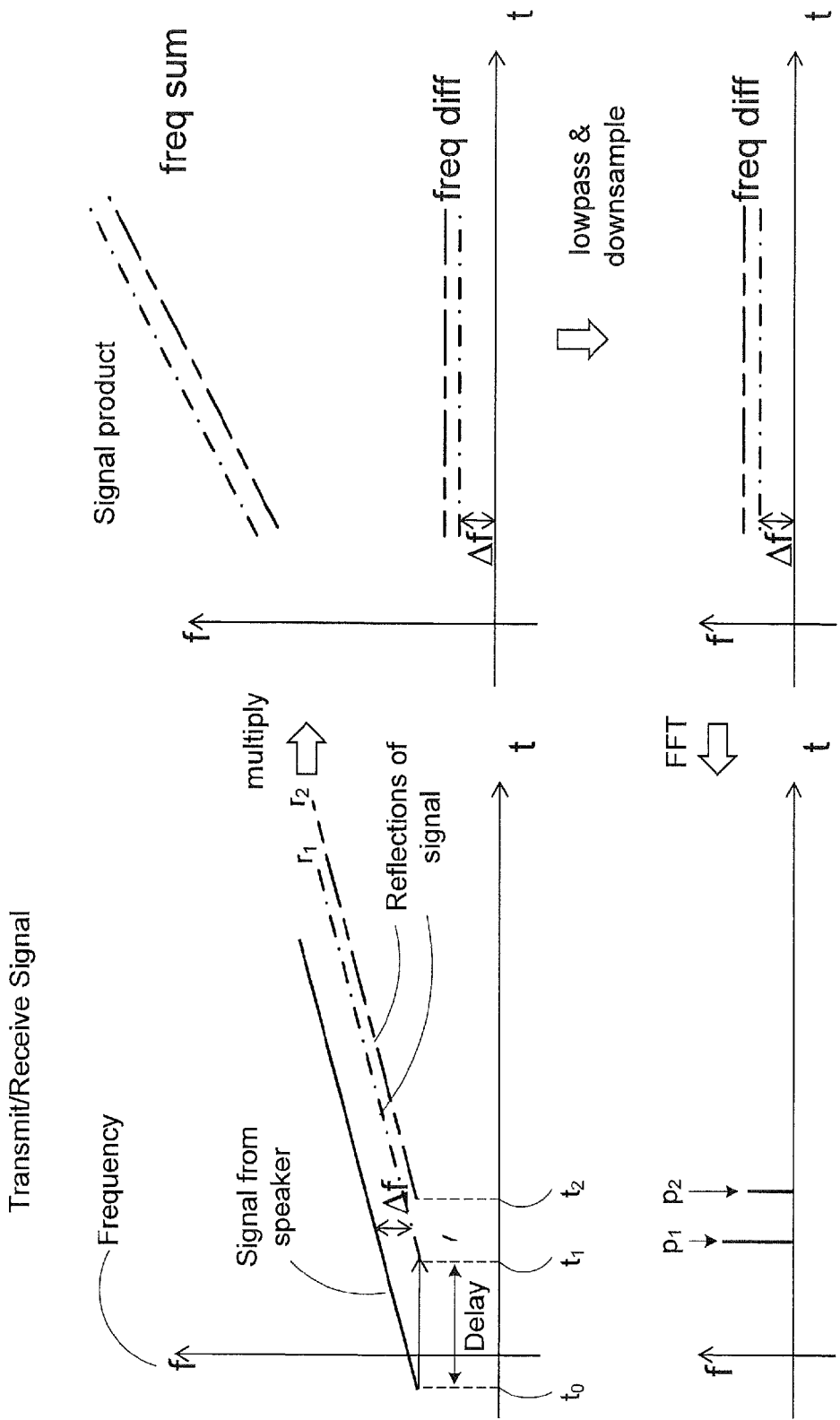
FIG. 11 is a diagram of particular illustrative signals associated with the system of FIG. 10.

In accordance with a described embodiment, an electronic device may transition out of a low-power mode (e.g., from a sleep mode to an active mode) in response to detection of signal reflections having a particular characteristic when compared to a transmitted signal. For example, as illustrated in FIG. 10, an electronic device can be configured with a speaker 1002 and a microphone 1004. When the electronic device is in a low-power mode, the speaker 1002 emits a signal. As the signal hits objects (e.g., an illustrative object 1006), the signal is reflected and some of the reflections are detected by the microphone 1004. In one implementation, as shown in FIG. 11, a signal with a frequency that varies linearly may be transmitted by the speaker 1002 and a reflection of the signal may be received at the microphone 1004. The electronic device may determine (e.g., via a low-power ultrasound detection front-end module or circuit 1008) whether the reflection indicates a request to transition out of the low-power mode (e.g., situations such as taking a phone out of a pocket, flipping a phone from face down to face up, etc.) via a device wakeup module or circuit 1010. To determine whether the reflection indicates a request to transition out of the low-power mode, a frequency difference between a frequency of the reflection and a frequency of the signal emitted from the speaker 1002 at the time the reflection is received may be calculated.

For example, as illustrated in FIG. 11, an ultrasound signal (designated "signal from speaker" in FIG. 11) may be emitted from a speaker of an electronic device (e.g., the electronic device of FIG. 10) at a first time (e.g., t0). A first reflection of the ultrasound signal (e.g., designated $r_1$ in FIG. 11) may be received by a microphone at a second time (e.g., t1). A frequency of the first reflection at t1 may correspond to a frequency of the ultrasound signal at t0. Upon receiving the first reflection, the electronic device may begin a method to calculate the frequency difference of the first reflection. To begin the method, the electronic device may multiply the frequency of the ultrasound signal at t1 and the frequency of the first reflection at t1 to produce a frequency difference and a frequency sum. The frequency difference may indicate a distance that an object that caused the first reflection is from the electronic device. The frequency difference and frequency sum are processed through a low pass filter to remove the frequency sum and isolate the frequency difference. The electronic device may perform a fast Fourier transform on the isolated frequency difference to generate an amplitude value (e.g., the lower left quadrant of FIG. 11) corresponding to the distance of the object from the electronic device. A second reflection of the ultrasound signal (e.g., designated $r_2$ in FIG. 11) may be received by the microphone at a third time (e.g., t2). In response to receiving the second reflection, the electronic device may perform the method steps again. As shown in FIG. 11, after calculating the frequency differences of the first reflection and the second reflection a first peak and a second peak are identified (e.g., p1 and p2).

By sequentially performing the above-described method using the first and second reflections numerous times, a spectrum of peaks may be generated. The generated spectrum of peaks may be used to determine whether to transition the electronic device out of the low-power mode. For example, a particular spectrum may indicate whether the device is to transition out of the low-power mode. The electronic device may include a memory to store one or more known spectrums (e.g., a spectrum indicating that the electronic device is in a user's pocket, the electronic device is face down on a table, etc.). A first stored spectrum may correspond to a spectrum that is not to cause the electronic device to transition out of the low-power mode (e.g., the phone is in the user's pocket). The electronic device may transition out of the low-power mode based on the generated spectrum.

In another implementation, a waveform of the ultrasound signal may vary according to a cosine wave. The ultrasound signal may be transmitted by the speaker and a reflection of the signal may be received at the microphone. As explained above with reference to FIG. 11, a waveform of the first reflection at a time t1 may correspond to the waveform of the ultrasound signal at t0. The electronic device may transition out of the low-power mode based on a phase difference between the waveform of the reflection at t1 and the waveform of the ultrasound signal at t1.

Figure 12:
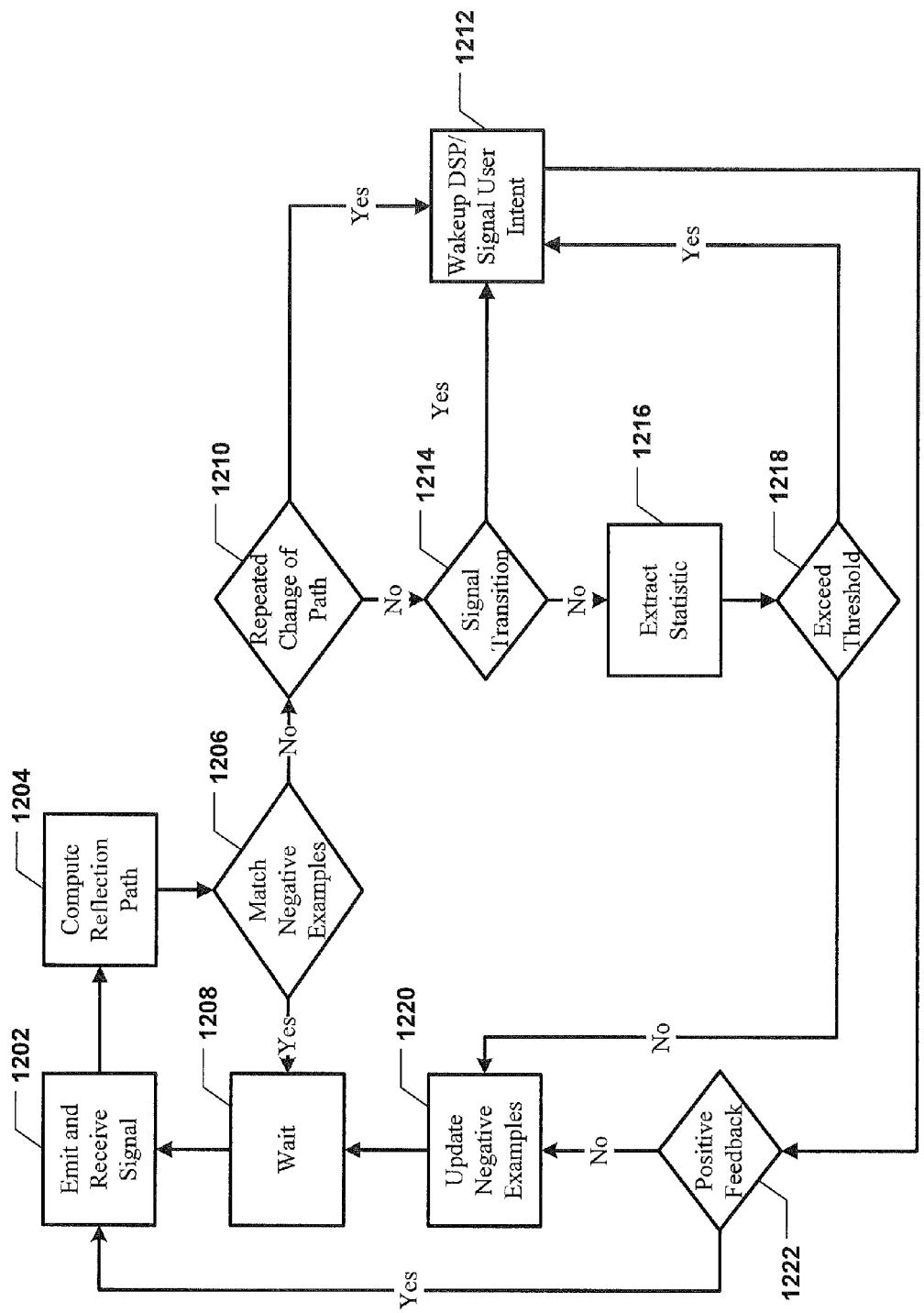
FIG. 12 is a flowchart of a particular embodiment of a low-power proximity detection method performed at the system of FIG. 10.

FIG. 12 is an exemplary flowchart of a method of determining whether to transition the electronic device out of the low-power mode. The method begins with emitting a signal from a speaker of the electronic device and receiving at least one reflection of the signal, at 1202. As explained above, when the reflection is received, a spectrum/reflection path is generated (e.g., based on a frequency difference or based on a phase difference), at 1204. The spectrum may be compared to stored negative examples, at 1206. Negative examples may correspond to spectrums that are not to cause a transition out of the low-power mode (e.g., a reflection path that indicates the phone has shifted in the user's pocket). If the spectrum matches a stored negative example the electronic device may wait a period of time, at 1208, before transmitting a second ultrasound signal from the speaker and restarting the method. The stored negative examples may expire after a period of time and/or include default negative examples. Additional negative examples may be stored dynamically as described in more detail below.

When the spectrum does not match a negative example, the electronic device may determine whether the spectrum indicates a signal with a repeated change of path (e.g., a hand being waived in front of the electronic device), at 1210. If the spectrum indicates a repeated change of path, the electronic device may transition out of the low-power mode, at 1212.

When the spectrum does not indicate a signal with a repeated change of path, the electronic device may determine whether the spectrum indicates a signal transition, at 1214. For example, the electronic device may determine that a first spectrum indicates that the electronic device is in a pocket of a user. If a second spectrum is calculated that indicates the electronic device is not in the pocket of the user, the electronic device may transition out of the lower power mode, at 1212. As another example, if the electronic device is a phone, a first spectrum may indicate that the phone has been placed on a desk with a display screen of the phone facing down towards the desk. If, at a later time, a second spectrum is calculated that indicates the phone has been picked up off the desk or that the display screen is no longer facing down towards the desk, the electronic device may transition out of the lower power mode.

When the spectrum does not indicate a signal transition, the electronic device may extract a characteristic of the spectrum (e.g., energy indicated by the spectrum, intensity of the spectrum, etc.), at 1216, and determine whether the characteristic exceeds a threshold value, at 1218. If the characteristic exceeds the threshold value, the electronic device may transition out of the low-power mode, at 1212. Otherwise, the electronic device may update the negative examples, at 1220, and wait a period of time, at 1208, before transmitting a second ultrasound signal from the speaker.

Upon transitioning out of the low-power mode, at 1212, the electronic device may be configured to transition back into the low-power mode if no activity (e.g., positive feedback, at 1222) at the electronic device is detected. Additionally, if a false positive condition is detected, the spectrum associated with the reflection that caused the device to transition out of the low-power mode may be added to the stored negative examples (e.g., because the spectrum was a false positive), at 1220.

Using ultrasound transmitters and microphones to identify when to transition an electronic device out of a low-power mode may consume less power than other techniques (e.g., optical/infra-red type systems and wake up on touch type systems). Additionally, because many electronic devices are already equipped with a speaker and a microphone, no extra transducers or sensors are needed.

In conjunction with the described embodiments, an apparatus is disclosed that includes first sensor means for generating a first output and having a first sensor type. For example, the first sensor means for generating may be the ultrasound sensor 111 of FIGS. 1-2 and 5, the ultrasound processing/control module 112 of FIGS. 1-2 and 5, the ultrasound tracking module 201 of FIG. 2, the ultrasound gesture recognition module 202 of FIG. 2, one or more other devices or circuits to generate a first output and having a first sensor type, or any combination thereof.

The apparatus may also include second sensor means for generating second output and having a second sensor type that is different from the first sensor type. For example, the second sensor means for generating may be the camera 113 of FIGS. 1-2 and 5, the image processing/control module 114 of FIGS. 1-2 and 5, the camera tracking module 203 of FIG. 2, the camera gesture recognition module 204 of FIG. 2, one or more other devices or circuits to generate a second output and having a second sensor type that is different from a first sensor type, or any combination thereof.

The apparatus may further include means for detecting a gesture based on the first output and the second output according to a complementary voting scheme that is at least partially based on gesture complexity. For example, the means for detecting may be the gesture recognition module 118 of FIGS. 1-2 and 5, the multi-mode gesture discrimination module 205 of FIG. 2, the extended gesture interface 206 of FIG. 2, one or more other devices or circuits to detect a gesture, or any combination thereof.

The apparatus may include means for determining a lighting level. For example, the means for determining the lighting level may be the light detector 115 of FIG. 1, the light detector 116 of FIG. 1, one or more other devices or circuits to determine a lighting level, or any combination thereof. The apparatus may also include means for determining a gesture range. For example, the means for determining the gesture range may be the ultrasound sensor 111 of FIGS. 1-2 and 5, the camera 113 of FIGS. 1-2 and 5, the ultrasound processing/control module 112 of FIGS. 1-2 and 5, the image processing/control module 114 of FIGS. 1-2 and 5, the ultrasound tracking module 201 of FIG. 2, the camera tracking module 203 of FIG. 2, one or more other devices or circuits to determine a gesture range, or any combination thereof.

The apparatus may further include means for selectively deactivating the second sensor means based on the lighting level and the gesture range. For example, the means for selectively deactivating may be a portion of the camera 113 of FIGS. 1-2 and 5, the image processing/control module 114 of FIGS. 1-2 and 5, one or more other devices or circuits to selectively deactivate sensor means, or any combination thereof.

Those of skill would further appreciate that the various illustrative logical blocks, configurations, modules, circuits, and algorithm steps described in connection with the embodiments disclosed herein may be implemented as electronic hardware, computer software executed by a processing device such as a hardware processor, or combinations of both. Various illustrative components, blocks, configurations, modules, circuits, and steps have been described above generally in terms of their functionality. Whether such functionality is implemented as hardware or executable software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in a non-transitory storage medium such as random access memory (RAM), magnetoresistive random access memory (MRAM), spin-torque transfer MRAM (STT-MRAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or a user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. An apparatus comprising:
a first sensor configured to generate a first output;
a camera configured to generate a second output; and
a processor configured to:
    detect a gesture based on at least one of the first output and the second output when a lighting level is greater than or equal to a threshold; and
    deactivate at least a portion of the camera and perform gesture recognition based on the first output from the first sensor when the lighting level is less than the threshold.

2. The apparatus of claim 1, wherein the first sensor comprises an ultrasound sensor.

3. The apparatus of claim 2, further comprising:
an ultrasound processing path configured to process the first output; and
an image processing path configured to process the second output,
wherein the ultrasound processing path is configured to send gesture range information to the image processing path,
wherein the gesture range information includes data related to a position of an object relative to the ultrasound sensor,
wherein the camera is configured to identify an area of interest based on the position of the object, and
wherein the camera is configured to activate a portion of a sensor array of the camera that corresponds to the area of interest and to deactivate other portions of the sensor array of the camera.

4. The apparatus of claim 1, further comprising a light detector internal to the camera and configured to determine the lighting level.

5. The apparatus of claim 1, further comprising a light detector external to the camera and configured to determine the lighting level.

6. The apparatus of claim 1, wherein
the processor is configured to perform gesture recognition by using a voting scheme to select between the first output and the second output conditioned on a gesture range exceeding a nearness threshold and being less than a farness threshold.

7. The apparatus of claim 6, wherein the voting scheme is at least partially based on gesture complexity.

8. A method comprising:
receiving a first output from a first sensor of an electronic device, wherein the first sensor has a first sensor type;
receiving a second output from a second sensor of the electronic device, wherein the second sensor has a second sensor type that is different from the first sensor type, and wherein the second sensor type comprises a camera sensor type;
when a lighting level is greater than or equal to a threshold, detecting a gesture based on the first output and the second output according to a voting scheme that is at least partially based on gesture complexity; and
when the lighting level is less than the threshold, deactivating at least a portion of the second sensor and performing gesture recognition based on the first output from the first sensor.

9. The method of claim 8, wherein the first sensor type comprises at least one of an ultrasound sensor type, an infrared sensor type, and a magnetic sensor type.

10. The method of claim 8, wherein the first output identifies a first gesture with a first confidence score and wherein the second output identifies a second gesture with a second confidence score.

11. The method of claim 10, wherein detecting the gesture according to the voting scheme comprises:
when the first sensor and the second sensor identify the same gesture, selecting the same gesture as an output gesture; and
when the first sensor and the second sensor identify different gestures, selecting a gesture having a higher confidence score as the output gesture.

12. The method of claim 11, wherein detecting the gesture according to the voting scheme further comprises, when the first sensor and the second sensor identify gestures of varying complexity, selecting a more complex gesture as the output gesture.

13. The method of claim 11, wherein the first sensor and the second sensor output data in accordance with a common data model.

14. The method of claim 13, wherein a first processing path associated with the first sensor receives the data output by the second sensor, and wherein a second processing path associated with the second sensor receives the data output by the first sensor.

15. The method of claim 8, further comprising receiving third output from a third sensor, wherein the gesture is detected further based on the third output from the third sensor.

16. An apparatus, comprising:
first sensor means for generating a first output and having a first sensor type;

second sensor means for generating a second output and having a second sensor type that is different from the first sensor type;

means for detecting a lighting level;

means for selectively deactivating the second sensor means in response to determining that the lighting level is less than a threshold; and means for detecting a gesture, the means for detecting the gesture configured to, when the lighting level is greater than or equal to the threshold, perform gesture recognition based on the first output and the second output according to a voting scheme that is at least partially based on gesture complexity and configured to perform gesture recognition based on the first output from the first sensor means when the lighting level is less than the threshold.

17. The apparatus of claim 16, further comprising means for determining a lighting level; and means for determining a gesture range.

18. The apparatus of claim 17, wherein the means for selectively deactivating is configured to selectively deactivate the at least a portion of the second sensor means further based on and the gesture range.

19. An apparatus, comprising:

an ultrasound sensor configured to generate a first output in accordance with a common data model and to provide the first output to an ultrasound processing path;

a camera configured to generate a second output in accordance with the common data model and to provide the second output to an image processing path;

a processor; and a gesture detection module executable by the processor to detect a gesture based on at least one of the first output and the second output, wherein the ultrasound processing path and the image processing path are configured to exchange data in accordance with the common data model, wherein the data includes a position of an object relative to the ultrasound sensor or the camera, and wherein the camera is configured to identify an area of interest based on the position of the object.

20. The apparatus of claim 19, wherein the data exchanged in accordance with the common data model further includes the first output from the ultrasound sensor, the second output from the camera, data related to a range of the object to the ultrasound sensor or the camera, data associated with an active configuration of the ultrasound sensor or the camera, or any combination thereof.

21. The apparatus of claim 19, wherein the camera is configured to activate a portion of a sensor array in the camera that corresponds to the area of interest and to deactivate other portions of the sensor array in the camera.

22. The apparatus of claim 19, wherein the ultrasound processing path is configured to determine whether a particular detected gesture is a false positive based on the data received from the image processing path.

23. The apparatus of claim 19, further comprising a light detector configured to detect a lighting level.

24. An apparatus comprising:

an ultrasound sensor configured to provide a first output to an ultrasound processing path;

a camera configured to provide a second output to an image processing path;

a processor; and a gesture detection module executable by the processor to detect a gesture based on at least one of the first output and the second output, wherein the ultrasound sensor and the camera are each configured to self-adjust, independent of the processor, based on data exchanged between the ultrasound processing path and the image processing path.

25. The apparatus of claim 24, wherein the ultrasound sensor is configured to self-adjust an active configuration, a signal emission frequency, a signal emission direction, or any combination thereof, based on the second output from the camera.

26. The apparatus of claim 24, wherein the camera is configured to self-adjust an active configuration, a focal length, an area of focus, or any combination thereof, based on the first output from the ultrasound sensor.

27. The apparatus of claim 24, wherein the gesture detection module is configured to detect the gesture by using a voting scheme that is at least partially based on gesture complexity.

28. A non-transitory processor-readable medium comprising instructions that, when executed by a processor, cause the processor to:

receive a first output from a first sensor of an electronic device, wherein the first sensor has a first sensor type;

receive a second output from a second sensor of the electronic device, wherein the second sensor has a second sensor type that is different from the first sensor type, and wherein the second sensor type comprises a camera sensor type;

when a lighting level is greater than or equal to a threshold, detect a gesture based on the first output and the second output according to a voting scheme that is at least partially based on gesture complexity; and when the lighting level is less than the threshold, deactivate at least a portion of the second sensor and perform gesture recognition based on the first output from the first sensor.

29. The non-transitory processor-readable medium of claim 28, wherein the first output identifies a first gesture with a first confidence score and wherein the second output identifies a second gesture with a second confidence score.

30. The non-transitory processor-readable medium of claim 28, further comprising instructions that, when executed by the processor, cause the processor to receive a third output from a third sensor, wherein the gesture is detected further based on the third output from the third sensor.

* * * * *